March 2, 1926.     1,574,803
R. ERBAN
FRICTION GEAR
Filed June 21, 1924
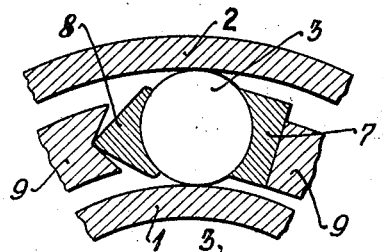
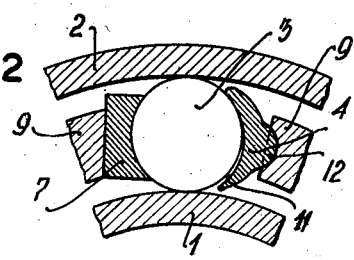
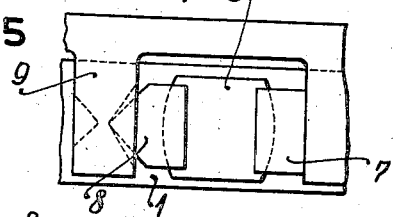
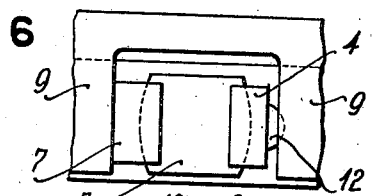
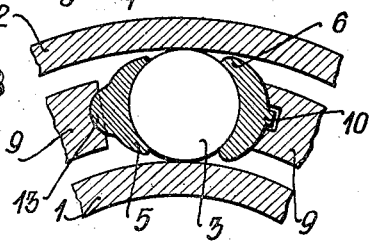
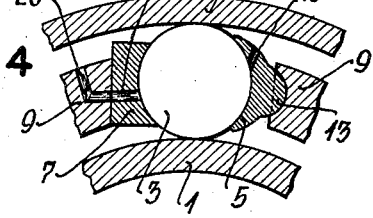
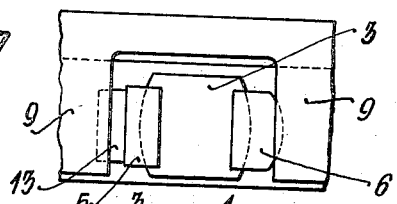
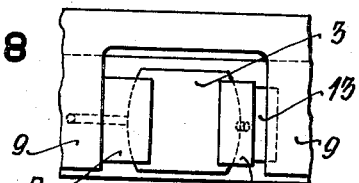
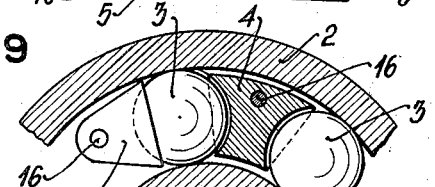
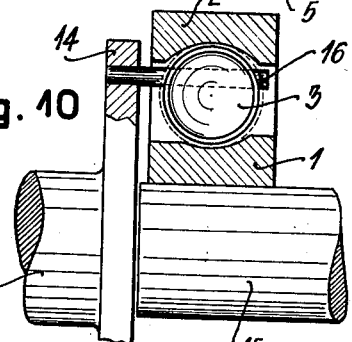
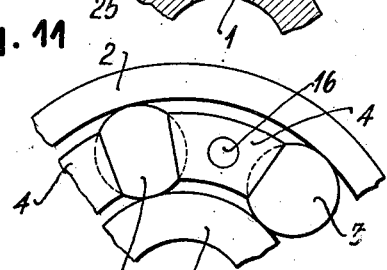
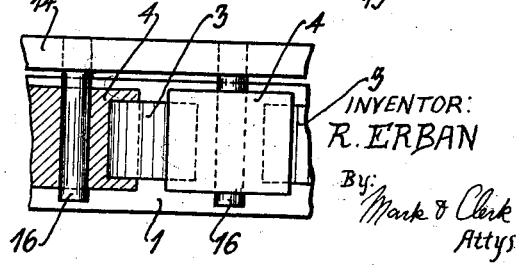
INVENTOR:
R. ERBAN
By: Mark & Clerk
Attys Patented Mar. 2, 1926.

1,574,803

UNITED STATES PATENT OFFICE.

RICHARD ERBAN, OF VIENNA, AUSTRIA.

FRICTION GEAR.

Application filed June 21, 1924. Serial No. 721,541.

*To all whom it may concern:*

Be it known that I, RICHARD ERBAN, a citizen of the Republic of Austria, residing at Vienna, in the Republic of Austria, have invented certain new and useful Improvements in Friction Gears, of which the following is a specification.

Friction gears are known wherein the transmission of power between the running surfaces is effected by means of a plurality of rolling bodies. Those gears are constructed mostly for coaxial shafts, more rarely also for parallel or intersecting shafts. The rolling bodies, that are preferably employed, are balls, spherical rollers, cylinders, but also cones, double cones and any other bodies of rotation may be used.

It has been found in practice that the transmission of the peripheral force from these rolling bodies to their enclosing cage is attended by difficulties. When a single cage is used, it is difficult to get a uniform and sufficiently large bearing surface in the cage for all the rolling bodies. The use of the frequently proposed intermediate rollers which are mounted in the cage and against which the rolling bodies, mostly balls, in this case bear, is complicated and costly, because the intermediate rollers must be made of high-quality material in order that they shall not be crushed by the rolling action of the balls in short time.

The present invention allows of providing a uniformly good bearing of all the rolling bodies of a gear of this kind by the use of bearing cushions or bearing steps of suitable material which, whilst conforming closely to the shape of the rolling bodies, are mounted in a freely adjustable manner in the cage.

In the accompanying drawings:

Figs. 1 to 4 inclusive show several forms of the invention in partial cross section.

Figs. 5 to 8 inclusive show plan views of the same forms, the outer races having been removed to show the cages with the rolling bodies and the inner races underneath the same.

Fig. 9 is a cross section and Fig. 10 a longitudinal section of another modification.

Fig. 11 is an elevation and,

Fig. 12 a plan of a fragment of another embodiment.

In Figs. 1 to 8; 1 is the inner race, 2 is the outer race, 3 are the rolling bodies which here have by way of example the form of barrel-shaped rollers, 9 are the cross ribs of the cage, 4, 5, 6, 7 and 8 are bearing cushions which bear on one side against the rolling body 3 and on the other hand are movable in the cage 9. The several bearing cushions show various possible constructional forms of this adjustable manner of mounting. The cusion 4 (Figs. 2 and 6) is mounted by means of a semi-spherical stop 12, and is therefore able to rotate freely in all directions. The cushion 5 (Figs. 3, 4 and 7, 8 respectively) is mounted so as to be capable of swivelling and sliding with the help of a cylindrical surface 13. The semi-spherical or the cylindrical surfaces may be made with a greater radius than that shown at 6. (Figs. 3, 4 and 7, 8 respectively), but then it is necessary in such a case to prevent the bearing cushion from rotating with the rolling body; this may be done by means of a stop having for instance the form shown at 10.

The bearing cushions may be also slidable in all directions as shown at 7—7, (Figs. 1, 2, 4 and 5, 6, 8 respectively) or be capable of swivelling on a knife-edge or around a point as at 8.

By suitably shaping the bearing surfaces and correspondingly suporting the bearing cushions, the formation of a wedge-shaped layer of oil in the advancing part 11 (Fig. 2) is promoted whereby the friction between the rolling body and the bearing cushion is still further reduced, as in the well known Michell footstep bearings.

As before stated, Fig. 9 is a cross section and Fig. 10 a longitudinal section of another modification, wherein the cage is provided with a series of pins 16 fixed on the disc 14 which is connected to a shaft 18. The bearing cushions 4 are rotatable around the pins 16, and are also freely slidable in the longitudinal direction of the pins 16. Balls 3 are shown employed as the rolling bodies. The bearing cushions 4 are therefore made on each side with a corresponding recess having the shape of a parti-spherical bearing step against which the balls bear in one or the other direction in the transmission of the power. If it is desired to promote the formation of the wedge-shaped layer of oil for a particular direction of rotation, the arrangement may be made such that the direction of the pressure of the balls against the cushion shall be laterally of the pin 16. For the direction of rotation indicated in Fig. 9, and on the assumption that the inner race is the driving part, then in order to produce the oil wedge, the direction of the pressure of the balls 3 must pass the pin 16 on the inside, for which purpose the pin 16 is drawn as being situated well toward the outer race.

If the gear is to be used only for one direction of rotation and force, it will be sufficient to make the bearing cushions 25 (Fig. 9) simply one-sided. In Fig. 10 the partispherical bearing of the bearing cushion is shown in elevation, and the ball 3 situated in front of it is merely indicated in broken lines.

Finally the bearing cushions, when suitably constructed, may also be used for guiding the rolling bodies laterally where this is not done by the race itself, or the same construction of the bearing cushions may be employed to prevent them from falling off the pins.

Figs. 11 and 12 illustrate these constructional forms in end elevation and in plan. 1 is the inner race; 2 is the outer race; 3 are the rolling bodies, cylinders in this case; 16 are the pins on which the bearing cushions 4 are mounted so as to be capable of rotational and longitudinally sliding motion. In Fig. 12 on the left-hand slide a bearing cushion 4 is shown in section, and on the right-hand side a bearing cushion 4 is shown in plan. The bearing cushions embrace the end surfaces of the rolling bodies, as is clearly shown in Fig. 12, and thereby provide lateral guidance for the same. The end surfaces of the rolling bodies are shown as flat circular surfaces, but it is obvious that the same arrangement may be employed with any other shaped surface of rotation (cone, spherical segment, etc.).

In addition to the mentioned and illustrated constructional forms of the movable bearing cushions, every other form may be employed, without thereby departing from the nature of the invention. Likewise, two of the mentioned constructional forms may be combined together, for instance a swivelling arrangement with a transversely slidable arrangement (5 and 7 in Figs. 4 and 8), if this should be advantageous or necessary in special cases.

The constructional formation of the bearing cushions may vary greatly. Bearing cushions as shown at 4, Fig. 9, may be cast for instance whole in white metal or bronze; or only the bearing surfaces of a suitable foundation containing the guidance for the pin, may be cast in bearing metal.

In the case of very highly loaded bearing surfaces these may be supplied with oil through suitable holes 19 and 20 in the bearing cushions and the cage respectively (Figs. 4 and 8), similarly to the manner adopted in the known forced lubrication systems.

What I claim is:

1. A friction gear including running surfaces, a plurality of rolling bodies for effecting the transmission of power between the running surfaces, a cage associated with the rolling bodies, and bearing cushions freely adjustable in the cage and engaging said rolling bodies, the transmission of the peripheral force from the rolling bodies to the cage taking place through said cushions.

2. A friction gear as claimed in claim 1, wherein the bearing surfaces of the movable bearing cushions conform closely to the shape of the rolling bodies, so that a relatively large bearing surface is provided, the mobility of the bearing cushions permitting the formation of a wedge-shaped layer of lubricant between the cushion and the rolling body.

3. A friction gear as claimed in claim 1, in which the cage is provided with pins, the bearing cushions being rotatably and slidably mounted on said pins.

4. A friction gear as claimed in claim 1, wherein the bearing cushions are furnished symmetrically with two bearing surfaces, of which only the one or the other comes to bear at any time on the rolling bodies, for the purpose of enabling the gear to be used for both directions of rotation.

5. A friction gear as claimed in claim 1, wherein the bearing cushions are each cast whole of bearing metal.

6. A friction gear as claimed in claim 1, wherein the bearing cushions are provided with holes to receive lubricant under pressure.

In testimony whereof I have hereunto set my hand.

RICHARD ERBAN.